July 26, 1932.  E. BURKE ET AL  1,868,881
METHOD OF LAYING MULTIPLE FIBER CONDUIT
Filed Jan. 14, 1931
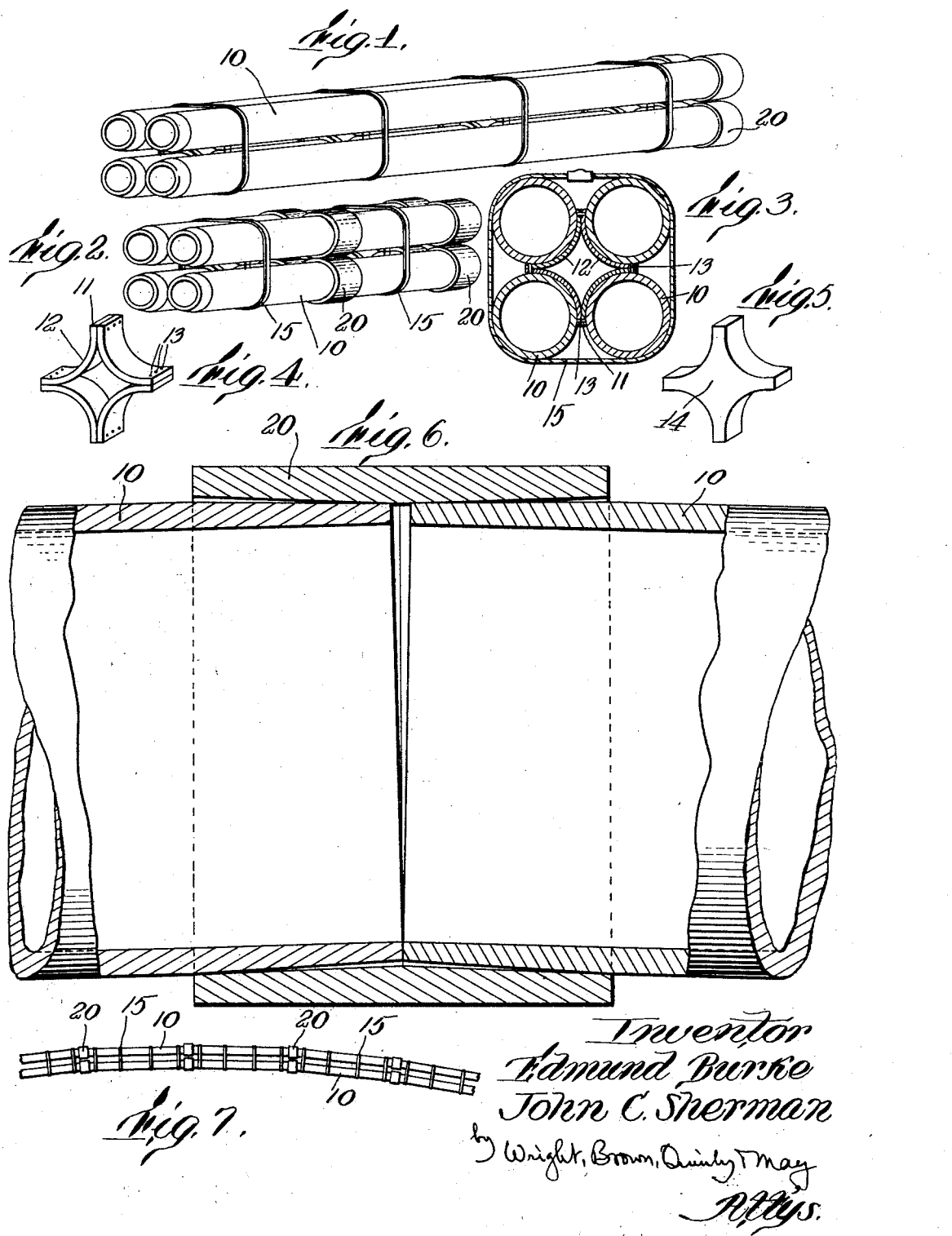
Inventor
Edmund Burke
John C. Sherman
by Wright, Brown, Quinby & May
Attys.

Patented July 26, 1932

1,868,881

UNITED STATES PATENT OFFICE

EDMUND BURKE, OF PORTLAND, AND JOHN C. SHERMAN, OF GORHAM, MAINE, ASSIGNORS TO BROWN COMPANY, OF BERLIN, NEW HAMPSHIRE, A CORPORATION OF MAINE

METHOD OF LAYING MULTIPLE FIBER CONDUIT

Application filed January 14, 1931. Serial No. 508,636.

This application is a continuation-in-part of our copending application Serial No. 139,976, filed October 7, 1926, which has become Patent No. 1,799,673, April 7, 1931. The invention relates to built-up units of multiple conduit and methods for producing and laying the same. In the laying of underground or enclosed wires for telephones, power transmission or otherwise, the wires are frequently led through a number of parallel conduits of moderate size, it being usually of advantage to segregate different wires or groups of wires. Consequently there are many installations calling for a series of parallel conduits. Where an installation of this kind is desired, it has been the practice to use tile conduit having multiple passages, or more recently where it is desired to use waterproofed fibrous conduit, sections of single conduit have been built up in the process of laying, suitable blocks being used to space the parallel conduits evenly. The fibrous type of conduit has many advantages over the vitreous type, among them being lightness, cheapness, strength and toughness. Furthermore, the material can be machined so that the ends can be easily shaped to make tight joints. Especially suited for uses of this kind is conduit made by extruding a heated plastic mass of fiber thoroughly mixed with a suitable waterproofing binder and formed into tubular shape as described in Letters Patent No. 1,780,948 granted to John C. Sherman November 11, 1930. Another suitable kind of conduit for the purpose is that which is made by rolling up a sheet of wet pulp under pressure into tubes having walls of homogeneous consistency, drying the tubes, and impregnating them with waterproofing material. But we do not limit ourselves to any particular kind of conduit. Where an installation calls for several parallel conduits, however, the cost of laying has been unnecessarily large. By our invention we may provide made-up sections of multiple conduit. Such sections can be made up of any desired number of single conduits within reasonable limits, and their use greatly facilitates the laying of multiple lines of conduit. They are easily handled, easily alined, and the ends of the individual conduits in the multiple sections may (and preferably do) have machined ends tapered to fit into suitable coupling members or to interfit with corresponding ends of other sections and to form watertight joints.

In laying conduit of this kind, it is frequently necessary to make bends in the line of conduits to follow, for example, a curve in a highway or the changes of slope of an uneven topography. Where the radius of curvature of such bends is sufficiently large, about 100 feet or over in the case of 8 foot sections of conduit, the tapered ends of the individual conduit sections can slip sufficiently in the coupling members to permit the laying of the bend or curve, the successive sections being chords of the curve. By using shorter sections, curves of considerably smaller radii may be similarly laid. Thus especially shaped sections for bends may be avoided except where sharp turns are required on small radii of curvature.

Waterproofed fibrous conduits of the type described are furthermore well suited for use as cores in the building of a monolithic concrete conduit. When thus employed, the fiber conduits are assembled in a trench or form into which wet concrete or grout is subsequently poured. The fiber cores remain in the concrete mass as liners for the conduits. If concrete spacing members are used in assembling multiple conduit sections, they bond with the grout to form a substantially monolithic concrete body enclosing the cores. To save space in transportation from the mill, the conduit section parts may be shipped in knocked down form and assembled at any convenient point into multiple sections ready to be lowered into a trench. The multiple sections are quickly and easily handled, thus materially cutting down the time and labor required for a job.

Further advantageous features of construction will appear from the description of our invention which follows and from the drawing, of which,—

Figure 1 is a perspective view of a section of multiple conduit embodying a form of our invention.

Figure 2 is a similar view of a shorter and composite multiple section.

Figure 3 is a transverse sectional view of the conduit shown in Figures 1 or 2.

Figure 4 is a perspective view of one form of spacer which may be employed between the individual conduit sections.

Figure 5 is a perspective view of another form of spacer.

Figure 6 is an elevation of an individual conduit joint, partly broken away.

Figure 7 is a plan view of a series of multiple conduit sections laid on a curve.

Referring to the drawing in detail, 10 represents sections of individual conduit of any suitable length which may be assembled into a multiple conduit such as that shown. For this purpose we prefer to use conduit of the waterproof fibrous type which usually comprises cellulosic or asbestos fiber thoroughly mixed or impregnated with a waterproofing compound such for example as pitch, asphalt, wax tailings or their equivalent. In making up a multiple conduit section, it is desirable that the individual conduits be spaced as accurately as possible from each other so as to avoid difficulty in joining abutting ends of successive sections when the latter are laid. It is also desirable at times to space the individual conduits apart from each other so as to permit the pouring of concrete around the conduits when laid in order to make a unified mass of the whole installation. In order to carry out these purposes as simply and economically as possible, we prefer to use for an assembly of our tubes as illustrated, a pre-formed spacer or core member 11 such as is shown in Figure 4 or Figure 5. The former may be made from a short length of tubing, the interior diameter of which is equal to the exterior diameter of the conduit in the assembly. This short length of tubing may be split longitudinally into four equal pieces 12 each comprising about 90° of arc. By arranging the pieces so that the interior concave surface of each faces outwardly, the pieces may be fastened together by pegs 13, adhesives, or otherwise, in a shape such as is shown in Figure 4, preferably symmetrical to an axis. Since the concave faces of each of the pieces 12 has a radius of curvature equal to the exterior radius of its corresponding conduit 10, the latter will fit closely against them as indicated in Figure 3 and may be secured thereto by adhesives, such as marine glue, pitch or the like, or by any other desired fastening means. These spacers may conveniently be made of the same materials as those employed in the conduits themselves, thus providing an economical use of short lengths of oversize conduit which might otherwise be waste. The spacer shown in Figure 5 consists of a block 14 of light material such as wood or cinder concrete having four concavities symmetrically arranged to receive the cylindrical walls of the conduits. Both forms of spacer are characterized by their comparative lightness of weight, and the concave faces against which a portion of the side walls of single conduits is adapted to fit. In order to strengthen the assembly and to hold the conduits 10 strongly in contact with the spacers, we may provide tie members 15 comprising strands or strips of material passed around the assembly and firmly secured, a tie member 15 being preferably placed opposite each spacer used in the assembly. The tie members are secured in any desired manner appropriate to the material of which they are made. Thus strings may be knotted, wires twisted, metal bands crimped or spot welded, etc. On account of their strength and lightness, thin steel bands are found very satisfactory.

For the purpose of joining successive sections end to end when laid, the individual sections may be machined to a slight taper, two degrees or so, to fit in a coupling collar 20 which is machined on its inner surface with corresponding tapers. This type of joint for conduits of the type described permits a moderate angle at the joint without seriously affecting the tightness of the joint, since waterproofed fiber tubes of the type described are characterized by a considerable degree of hardness and toughness, but will also yield slightly under pressure. Thus, as shown in Figure 6, successive conduits can be disposed at an angle to each other so as to carry the complete conduit around bends, as in Figure 7. The joint may be reinforced and improved by being smeared with a suitable cement such as molten asphalt, particularly at the ends of the collars 20.

The multiple conduit sections may be made up at the mill for shipment, or may be shipped knocked down to save space and consequent transportation charges. They can readily be assembled at a delivery point near the job, and are then ready to be laid quickly and easily. Each multiple section may be assembled with a set of couplings at one end, as shown in Figures 1 and 2, to facilitate laying. The multiple sections may be formed of full-length single sections, as in Figure 1, or of shorter lengths, as in Figure 2. In the latter case the couplings at the joints are preferably in a common transverse plane or planes substantially perpendicular to the conduits, so that the multiple section as a whole may be assembled with a bend at the joint. While each individual section of the multiple section illustrated in Figure 2 is composed of two joined lengths, it is obvious that more than two can be similarly joined as desired according to convenience in handling the assembled unit.

An embodiment of our invention having thus been described, it should be evident to those skilled in the art that various changes and modifications may be made therein without departing from its spirit or scope as defined by the appended claims.

We claim:

1. A method of laying multiple conduit in curves, which comprises tapering the ends of single conduit sections, assembling said single sections in multiple sections, and joining said multiple sections end to end with fiber coupling collars to form a continuous multiple conduit, some of the successive adjoining multiple sections being laid at an angle to each other to change the direction of the continuous conduit.

2. A method of laying multiple conduit in curves, which comprises tapering the ends of single conduit sections, assembling single sections in parallel spaced relation to form multiple sections, joining multiple sections end to end with fiber coupling collars to form a continuous multiple conduit, some of the successive adjoining multiple sections being laid at an angle to each other to change the direction of the continuous conduit, and reinforcing the joints between the conduit sections and coupling collars with a plastic coating.

In testimony whereof we have affixed our signatures.

EDMUND BURKE.
JOHN C. SHERMAN.